(12) United States Patent
Hashimoto

(10) Patent No.: US 7,969,468 B2
(45) Date of Patent: Jun. 28, 2011

(54) IMAGING APPARATUS AND WIRELESS COMMUNICATION PARTNER SEARCHING METHOD

(75) Inventor: Tetsuya Hashimoto, Inzai (JP)

(73) Assignee: Ricoh Company, Ltd., Tokyo (JP)

( * ) Notice: Subject to any disclaimer, the term of this patent is extended or adjusted under 35 U.S.C. 154(b) by 934 days.

(21) Appl. No.: 11/882,307

(22) Filed: Jul. 31, 2007

(65) Prior Publication Data

US 2008/0036879 A1   Feb. 14, 2008

(30) Foreign Application Priority Data

Aug. 1, 2006   (JP) .................................. 2006-210278

(51) Int. Cl.
*H04N 5/225* (2006.01)
*H04N 5/76* (2006.01)
*H04N 5/232* (2006.01)

(52) U.S. Cl. ............ 348/207.99; 348/231.99; 348/211.2
(58) Field of Classification Search .................. None
See application file for complete search history.

(56) References Cited

U.S. PATENT DOCUMENTS

| | | | |
|---|---|---|---|
| 5,815,201 A | 9/1998 | Hashimoto et al. | |
| 5,815,205 A | 9/1998 | Hashimoto et al. | |
| 6,111,604 A | 8/2000 | Hashimoto et al. | |
| 6,344,875 B1 | 2/2002 | Hashimoto et al. | |
| 6,791,596 B2 | 9/2004 | Nihei et al. | |
| 6,927,789 B2 | 8/2005 | Ozasa et al. | |
| 6,933,957 B2 | 8/2005 | Omori et al. | |
| 7,046,276 B2 | 5/2006 | Hashimoto et al. | |
| 7,164,438 B2 * | 1/2007 | Kindaichi | 348/207.1 |
| 7,212,224 B2 | 5/2007 | Nihei et al. | |
| 7,421,246 B2 * | 9/2008 | Layley et al. | 348/207.2 |
| 2003/0011680 A1 * | 1/2003 | Tanaka et al. | 348/207.1 |
| 2003/0067533 A1 | 4/2003 | Omori et al. | |
| 2003/0156184 A1 | 8/2003 | Suzuki et al. | |
| 2004/0036762 A1 | 2/2004 | Nihei et al. | |
| 2005/0089069 A1 | 4/2005 | Ozasa et al. | |
| 2005/0146596 A1 | 7/2005 | Nihei et al. | |
| 2005/0219354 A1 | 10/2005 | Omori et al. | |
| 2005/0243163 A1 | 11/2005 | Ozasa et al. | |
| 2005/0281234 A1 | 12/2005 | Kawamura et al. | |
| 2006/0046704 A1 | 3/2006 | Hori et al. | |
| 2006/0158528 A1 | 7/2006 | Hashimoto et al. | |
| 2006/0206592 A1 * | 9/2006 | Fujii et al. | 348/211.2 |
| 2006/0209170 A1 | 9/2006 | Nihei | |
| 2006/0285186 A1 | 12/2006 | Ishida et al. | |
| 2007/0030516 A1 | 2/2007 | Tsuji et al. | |
| 2007/0030548 A1 | 2/2007 | Nihei et al. | |
| 2007/0091163 A1 | 4/2007 | Omori et al. | |

(Continued)

FOREIGN PATENT DOCUMENTS

JP   2001-272615 A   10/2001

(Continued)

*Primary Examiner* — Luong T Nguyen
(74) *Attorney, Agent, or Firm* — Dickstein Shapiro LLP

(57) ABSTRACT

An imaging apparatus includes an imaging device for photographing a subject image to output as image data, a recording device for recording the image data as an image file, a wireless communication device, a partner device searching device for searching for a partner device of a wireless communication, and a wireless communication setting device for setting the wireless communication device to be effective or to be invalid, and when the wireless communication device is effectively set by the wireless communication setting device, the partner device searching device automatically starts the searching of the partner device with activation of the imaging device.

4 Claims, 11 Drawing Sheets

U.S. PATENT DOCUMENTS

2007/0132828 A1    6/2007   Ishida et al.
2010/0149345 A1*   6/2010   Hashimoto ................ 348/207.1

FOREIGN PATENT DOCUMENTS

| JP | 2001-350111 A | 12/2001 |
| JP | 2003-060959   | 2/2003  |
| JP | 2003-072135 A | 3/2003  |
| JP | 3644923       | 2/2005  |
| JP | 2005-159771 A | 6/2005  |
| JP | 2006-05774 A  | 1/2006  |
| JP | 2006-67488 A  | 3/2006  |
| JP | 2006-203625   | 8/2006  |

* cited by examiner

FIG. 10

| BD_ADDR (SPECIFIC ADDRESS OF BLUETOOTH DEVICE) | DEVICE CLASS (PC, PDA, CELL PHONE, PRINTER, ETC.) | | |
|---|---|---|---|

FIG. 11

| BLUETOOTH DEVICE'S NAME | | |
|---|---|---|

FIG. 12

| CORRESPOND-ENCE SERVICE (BIP, DUN) | | |
|---|---|---|

| DPO CORRE- SPOND- ENCE (1, 0) | CORRE- SPOND- ENCE ENCODE METHOD (JPEG, GIF, PNG) | CIRRE- SPOND- ENCE MAXIMUM FILE SIZE | MULTI PRINTING CORRE- SPOND- ENCE (1, 0) | INDEX PRINTING CORRE- SPOND- ENCE (1, 0) | |

IMAGING APPARATUS AND WIRELESS COMMUNICATION PARTNER SEARCHING METHOD

PRIORITY CLAIM

This application claims priority from Japanese Patent Application No. 2006-210278, filed with the Japanese Patent Office on Aug. 1, 2006, the contents of which are incorporated herein by reference in their entirety.

BACKGROUND OF THE INVENTION

1. Field of the Invention

The present invention relates to an imaging apparatus and a wireless communication partner searching method.

2. Description of the Related Art

An imaging apparatus having a wireless communication function (hereinafter, referred to as a communication imaging apparatus) has recently been developed in the imaging apparatus field, especially in the digital camera field for transferring data to and from an external device.

As a wireless communication technology, electromagnetic waves of varied standards, for example, "a wireless LAN technology such as IEEE802.11" and "Bluetooth" can be used in addition to a technology using infrared light such as a remote controller for conventional home electric appliances. Since such electromagnetic waves have penetration force, they are more practical than infrared light in communication ability even if there is an obstruction.

However, in general, portable small electric equipment is required to accumulate battery power for operating the equipment, so it is required to reduce the power consumption to the 1 mW order. Even the communication imaging apparatus is no exception, and it is an important problem to reduce power consumption of the communication imaging apparatus in every way.

In addition, when using the communication function, the communication imaging apparatus uses power for outputting electromagnetic waves. It is especially an important problem for the communication imaging apparatus to reduce this power consumption.

As an invention for solving the above problems, a digital camera is disclosed in JP2003-60959A, for example. This digital camera is connected with a wireless communication device via a network, so as to exchange information with each other. The digital camera includes a searching device for searching for a communicatable wireless communication device. This searching device searches for a communicatable wireless communication device if the power source of the camera is turned on.

However, if the imaging apparatus is designed to reduce only the power consumption, the usability of the communication imaging apparatus may be degraded. The improvement in the operability of the apparatus is another problem. More particularly, there is a problem with this communication imaging apparatus in that can not immediately start the communication when communicating with a partner device.

In a communication imaging apparatus which searches for a partner device in the background, the searching timing is not determined. Accordingly, there is a problem in that unnecessary power is consumed. In addition, the arithmetic ability of the communication imaging apparatus is spent for the searching process of the partner device, causing a problem in that a high-speed photographing process may be disturbed.

Moreover, an art, which can conduct communication as soon as an operator wishes to conduct the communication, is not disclosed in the digital camera described in JP2003-60959A. Therefore, there is a problem in that unnecessary power may be consumed when the communication is not necessary.

For the foregoing reasons, there is a need for an imaging apparatus which can conduct communication as soon as an operator wishes, does not consume unnecessary power by a partner searching process, and also does not disturb a high-speed photographing process.

SUMMARY OF THE INVENTION

A first aspect of the present invention involves an imaging apparatus, including; an imaging device for photographing a subject image to output as image data; a recording device for recording the image data as an image file; a wireless communication device; a partner device searching device for searching for a partner device of a wireless communication; and a wireless communication setting device for setting the wireless communication device to be effective or to be invalid, wherein when the wireless communication device is effectively set by the wireless communication setting device, the partner device searching device automatically starts the searching for the partner device with activation of the imaging device.

Preferably, after the partner device searching device automatically starts the searching for the partner device with the activation of the imaging device, the partner device searching device regularly repeats the searching, and stops an operation for regularly repeating the searching if a predetermined time has passed.

Preferably, the imaging apparatus further includes an operation mode setting device for setting an operation mode of the imaging apparatus; and an operation mode setting handling device for handling the operation mode setting device, wherein the operation mode includes a communication mode for conducting the wireless communication by using the wireless communication device, and when the operation mode is set to the communication mode by the operation mode setting device, after the partner device searching device automatically starts the searching for the partner device with the activation of the imaging device, the partner device searching device regularly repeats the searching for the partner device, and does not stop the operation for regularly repeating the searching if the predetermined time has passed.

A second aspect of the present invention involves a wireless communication partner searching method of an imaging apparatus including an imaging device for photographing a subject image to output as image data, a recording device for recording the image data as an image file, a wireless communication device, a partner device searching device for searching for a partner device of a wireless communication, and a wireless communication setting device for setting the wireless communication device to be effective or to be invalid, comprising: a wireless communication setting step of setting the wireless communication device to be effective or to be invalid; and a searching start step of automatically starting the searching for the partner device of the wireless communication with an activation step of activating the imaging device when the wireless communication device is effectively set by the wireless communication setting step.

Preferably, after the searching start step is conducted with the activation step, a regular searching step of regularly repeating the searching for the partner device of the wireless communication is conducted until a predetermined time has passed, and a searching stop step of stopping the searching is conducted if the predetermined time has passed.

Preferably, the imaging apparatus further includes an operation mode setting device for setting an operation mode of the imaging apparatus, and an operation mode setting handling device for handing the operation mode setting device, and the operation mode includes a communication mode for conducting the wireless communication by using the wireless communication device, the searching method further including: an operation mode setting handling step of handling the operation mode setting device by using the operation mode setting handling device; and an operation mode setting step of setting the operation mode of the imaging apparatus by using results of the operation mode setting handling step, wherein the regular searching step is conducted after the searching start step is conducted with the activation step, and when the results of the operation mode setting step are set to the communication mode, the searching stop step is not conducted if the predetermined time has passed.

BRIEF DESCRIPTION OF THE DRAWINGS

These and other features, aspects, and advantages of the present invention will become better understood with regard to the following description, appended claims, and accompanying drawings.

FIG. 10 is a view illustrating the contents of an inquiry result.

FIG. 11 is a view illustrating the contents of a name of a partner's device.

FIG. 12 is a view illustrating correspondence service information of a Bluetooth device.

DETAILED DESCRIPTION OF THE INVENTION

Hereinafter, an embodiment of the present invention will be described.

Figure 1A:
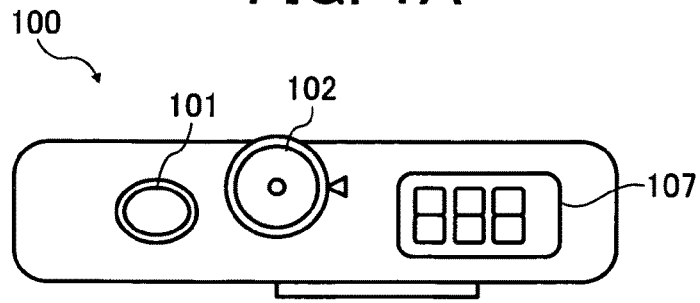
FIG. 1A is an external view illustrating a digital camera 100 according to an embodiment of the present invention.
Figure 1B:
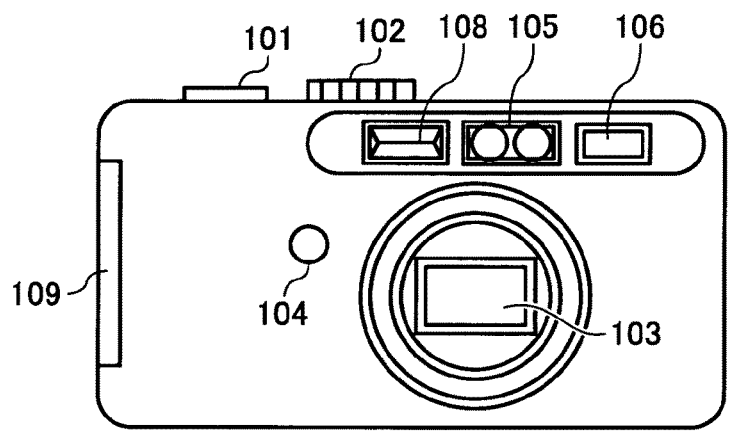
FIG. 1B is another external view illustrating the digital camera 100 according to the embodiment of the present invention.
Figure 1C:
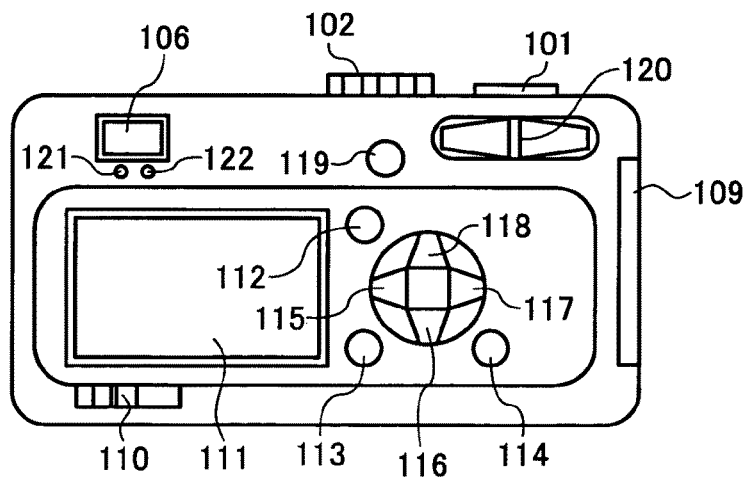
FIG. 1C is another external view illustrating the digital camera 100 according to the embodiment of the present invention.

FIG. 1A is an external view illustrating a plan view of a digital camera 100 according to the embodiment of the present invention. FIG. 1B is an external view illustrating a front view of the digital camera 100 according to the embodiment of the present invention. FIG. 1C is an external view illustrating a back view of the digital camera 100.

Referring to FIG. 1A and FIG. 1B, the digital camera 100 includes a case, and the case includes on a top face thereof a release shutter 101, a mode dial 102 and a sub LED 107. As illustrated in FIG. 1B, the case of the digital camera 100 includes on a front face thereof a lens barrel unit 103, a remote control light receiving section 104, a ranging unit 105, an optical finder 106, and a strobe light emitting section 108. Moreover, the case includes on a side face thereof a card/battery lid 109. As illustrated in FIG. 1C, the case of the digital camera 100 includes on a back face thereof a power source switch 110, a LCD monitor 111, a MENU switch 112, an OK switch 113, a display switch 114, a left/image confirmation switch 115, a down/micro switch 116, a right switch 117, an up/strobe light switch 118, a self timer/delete switch 119, a zoom switch 120, an auto focusing LED 121, a strobe LED 122, and an optical finder 106.

Figure 2A:
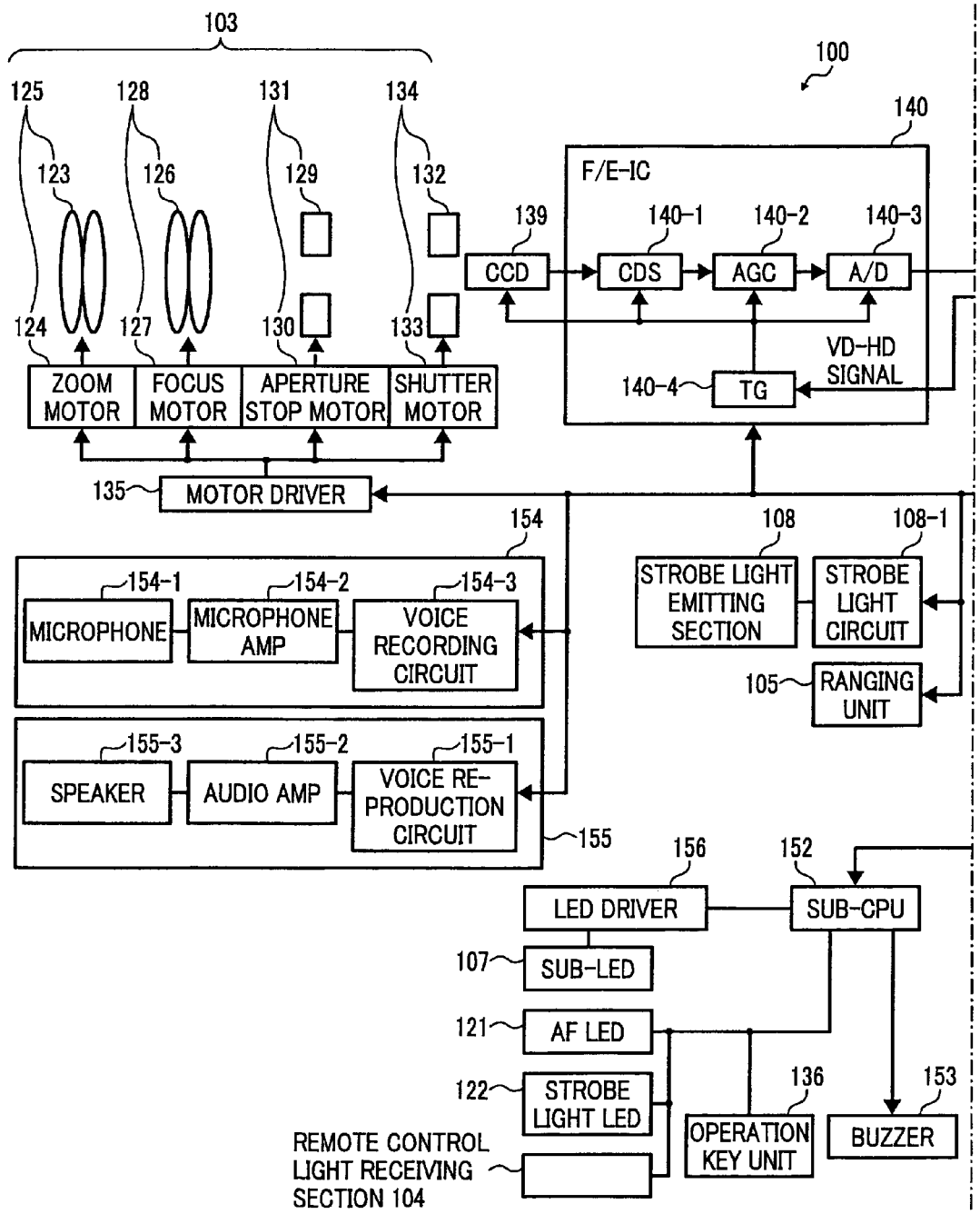
FIG. 2 is a block diagram illustrating the structure of the digital camera 100 according to the embodiment of the present invention.
Figure 2B:
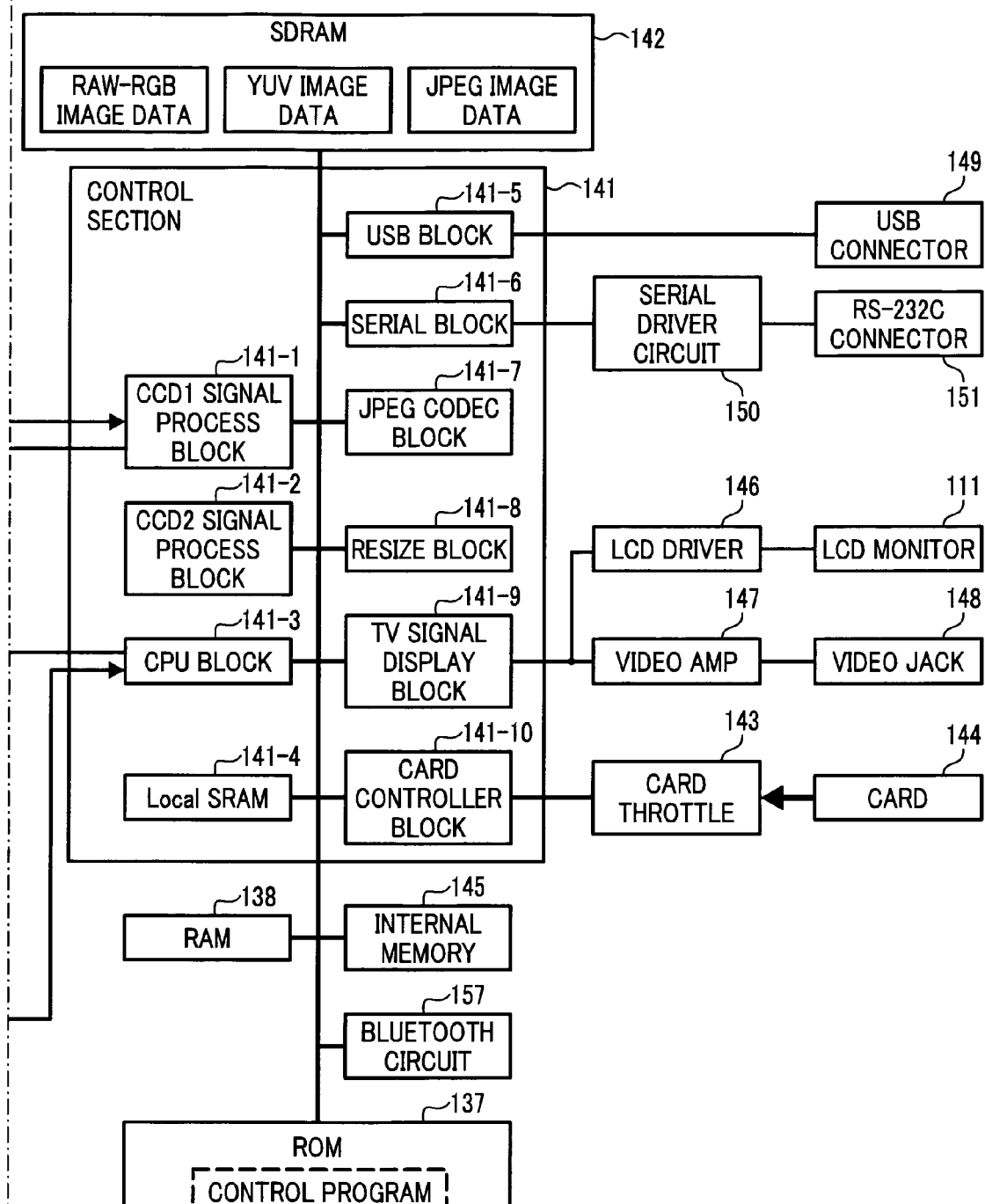

FIG. 2 is a block diagram illustrating the structure of the digital camera 100.

Referring to FIG. 2, the lens barrel unit 103 includes a zoom optical system 125 having a zoom lens 123 for introducing an optical image of a subject and a zoom driving motor 124, a focusing optical system 128 having a focus lens 126 and a focus driving motor 127, an aperture stop unit 131 having an aperture stop 129 and an aperture stop motor 130, a mechanical shutter unit 134 having a mechanical shutter 132 and a mechanical shutter motor 133, and a motor driver 135 for driving each of the motors. The motor driver 135 is controlled by a driving command from a CPU block, 141-3 in a control section 141 based on the input from the remote control light receiving section 104 and an operation input of an operation key unit 136.

A ROM 137 stores control programs and parameters for controlling, which are written by the CPU block 141-3-readable codes. If the power source of the digital camera 100 is in an ON state, the program is loaded in a main memory (not shown). The CPU 141-3 controls the operation of each of the sections in the apparatus according to the program, and temporarily stores the data or the like necessary for the control in a Local SRAM 141-4 in a RAM 138 and a control section 141. In addition, by using a rewritable flash ROM as the ROM 137, the control programs and the parameters for controlling can be changed, and the function can be easily upgraded.

A CCD 139 is a solid-state image sensor for photoelectrically converting an optical image. An F/E (front/end)-IC 140 includes a CDS 140-1 for performing correlation double sampling for eliminating image noise, an AGC 140-2 for conducting gain adjustment, an A/D converter 140-3 for conducting digital signal conversion and a TG 140-4 to which a vertical synchronization signal (hereinafter, referred to as VD) and a horizontal synchronization signal (hereinafter, refer to HD) are supplied from the CCD1 signal process block 141-1, so as to generate driving timing signals of the CCD 139, and the F/E 140 which are controlled by the CPU block 141-3.

The control section 141 performs white balance setting and gamma setting to the output data of the F/E-TC 140 from the CCD 139. The control section 141 includes the CCD 1 signal process block 141-1 for supplying a VD signal and an HD signal as described above, a CCD 2 signal process block 141-2 for performing conversion to brightness data and color difference data by a filtering process, the CPU block 141-3 for controlling the operation of each of the above described sections in the apparatus, the Local SRAM 141-4 for temporarily storing the data or the like necessary for the above-described control, a USB block 141-5 for conducting USB communication with an external device such as a personal computer, a serial block 141-6 for conducting serial communication with an external device such as a personal computer, a JPEG CODEC block 141-7 for carrying out JPEG compression and expansion, a RESIZE block 141-8 for expanding and reducing a size of image data by an interpolation process, a TV signal display block 141-9 for converting the image data into video signals to be displayed on an external display device such as a liquid crystal monitor and a TV, and a memory card controller block 141-10 for controlling a memory card which records the photographed image data.

An SDRAM 142 temporarily stores the image data when the various processes are conducted on the image data in the control section 141. The stored image data is loaded from the CCD 139 via the F/E-IC 140, and is "RAW-RGB image data" to which the white balance setting and gamma setting are conducted by the CCD 1 signal process block 141-1, "YUV image data" to which the brightness data and color difference data conversion is performed by the CCD 2 signal process block 141-2, and "JPEG image data" to which the JPEG compression is conducted by the JPEG CODEC block 141-7.

A card throttle 143 is a detachable throttle for mounting a card 144 such as a memory card, a LAN card, a wireless LAN card, and a Bluetooth card.

An internal memory 145 can store the photographed image data when the card 144 is not mounted on the card throttle 143.

A LCD driver 146 is a drive circuit for driving a LCD monitor 111 of a display section. The LCD driver 146 includes a function for converting the video signals output from the TV signal display block 141-9 into the signals for displaying on the LCD monitor 111. The LCD monitor 111 is used for monitoring a subject state before photographing, confirming the photographed image, and displaying the image data recorded in the card 144 or the internal memory 145. A video AMP 147 conducts 75Ω impedance amplification to the video signals output from the TV signal display block 141-9. A video jack 148 is used for connecting the imaging apparatus with an external display device such as a TV. A USB connector 149 is used for the USB connection between the imaging apparatus and an external device such as a personal computer.

A serial driver circuit 150 converts,the voltage of the output signal of the serial block 141-6, so as to conduct serial communication with an external device such as a personal computer. An RS-232C connector 151 is used for conducting serial connection with an external device such as a personal computer.

A SUB-CPU 152 is a CPU which houses ROM and RAM in one chip. The SUB-CPU 152 outputs the output signals of the operation key unit 136 and the remote control light receiving unit 104 to the CPU block 141-3 as operation information, and converts the camera state output from the CPU block 143-3 into the control signals of the sub LED 107, the auto focusing LED 121, the strobe light LED 122, and a buzzer 153, and outputs the control signals.

The sub LED 107 is a display unit for displaying the maximum burst for photographing, for example. The LCD driver 156 is a drive circuit for driving the sub LCD 107 by the output signals of the SUB-CPU 152.

The auto focusing LED 121 is an LED for displaying a focused state for shooting. The strobe LED 122 is an LED for displaying a strobe light charging state.

In addition, this auto focusing LED 121 and the strobe light LED 122 can be used for another display such as memory card accessing.

The operation key unit 136 is a key circuit which is operated by an operator. The remote control light receiving section 104 is a light receiving section of signals of a remote control sending device operated by an operator.

A voice recording unit 154 includes a microphone 154-1 by which an operator inputs voice signals, a microphone AMP 154-2 for amplifying the input voice signals, and a voice recording circuit 154-3 for recording the amplified voice signals. A voice reproducing unit 155 includes a voice reproducing circuit 155-1 for converting the recorded voice signals into signals which can be output from a speaker, an audio AMP 155-2 for amplifying the converted voice signals, so as to drive the speaker, and a speaker 155-3 for outputting the voice signals.

In addition, the connection with a device corresponding to Bluetooth is performed by a Bluetooth circuit 157. When the Bluetooth circuit 157 is not included, the connection with the device corresponding to the Bluetooth can be achieved by connecting a Bluetooth card into the card throttle 143. The connection with Ethernet (registered trademark) is performed by an Ethernet (registered trademark) connection circuit or a wireless Ethernet (registered trademark) connection circuit (not shown). If the Ethernet (registered trademark) circuit is not included, the imaging apparatus can be connected with a network by connecting a LAN card or a wireless LAN card to the card throttle 143.

(Description of Searching Process)

Hereinafter, the searching process for the Bluetooth communication of the digital camera 100 having the above structure will be described.

Prior to the Bluetooth communication, the Bluetooth communication is set to the digital camera 100.

The setting of the Bluetooth communication of the digital camera 100 is conducted by the following method.

Figure 3:
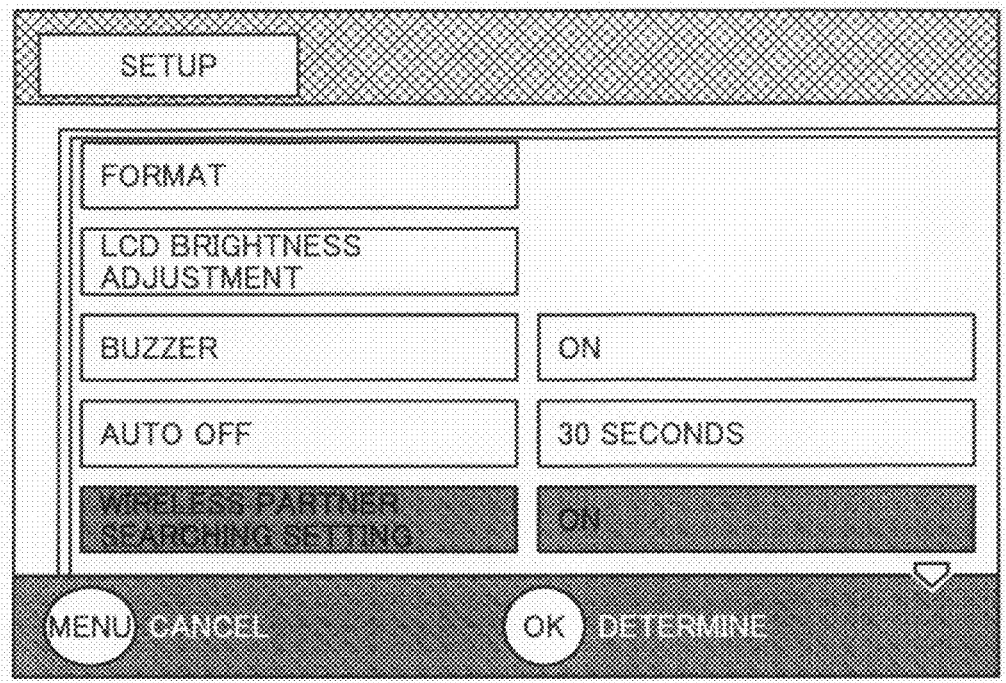
FIG. 3 is a view illustrating one example of a set-up menu screen.
Figure 4:
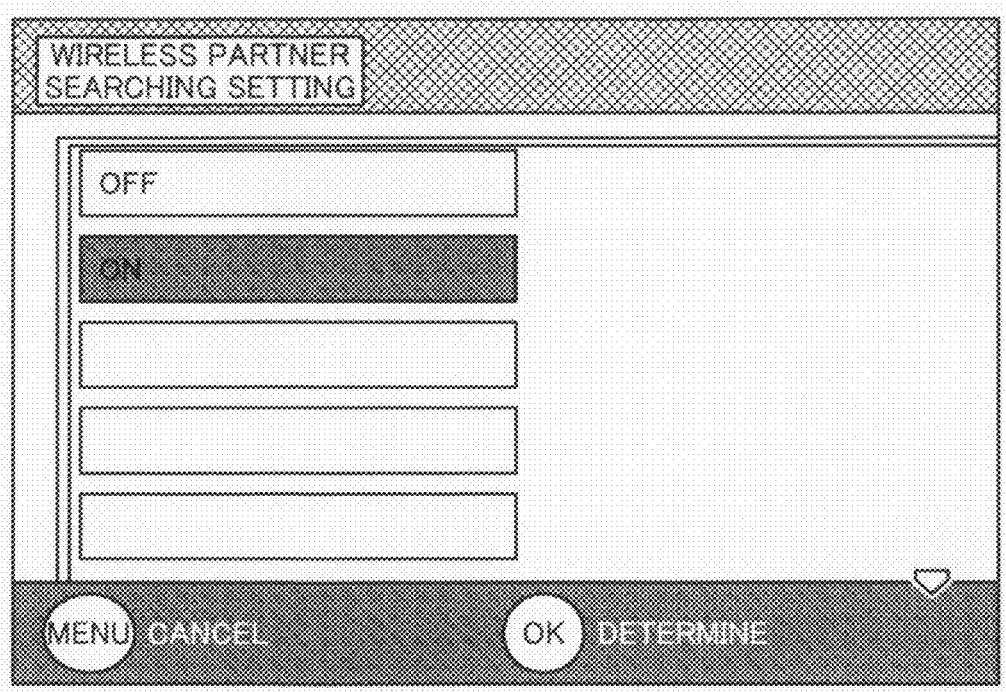
FIG. 4 is a view illustrating one example of a menu screen for wireless partner searching setting.

If the setup menu of the digital camera 100 is displayed on the LCD monitor 111, and "wireless partner searching setting" is selected to determine the wireless partner searching setting, a screen for selecting ON or OFF of the wireless partner searching setting is displayed. FIG. 3 illustrates the display example of the setup menu. FIG. 4 illustrates the display example of the wireless partner searching setting menu.

Figure 5:
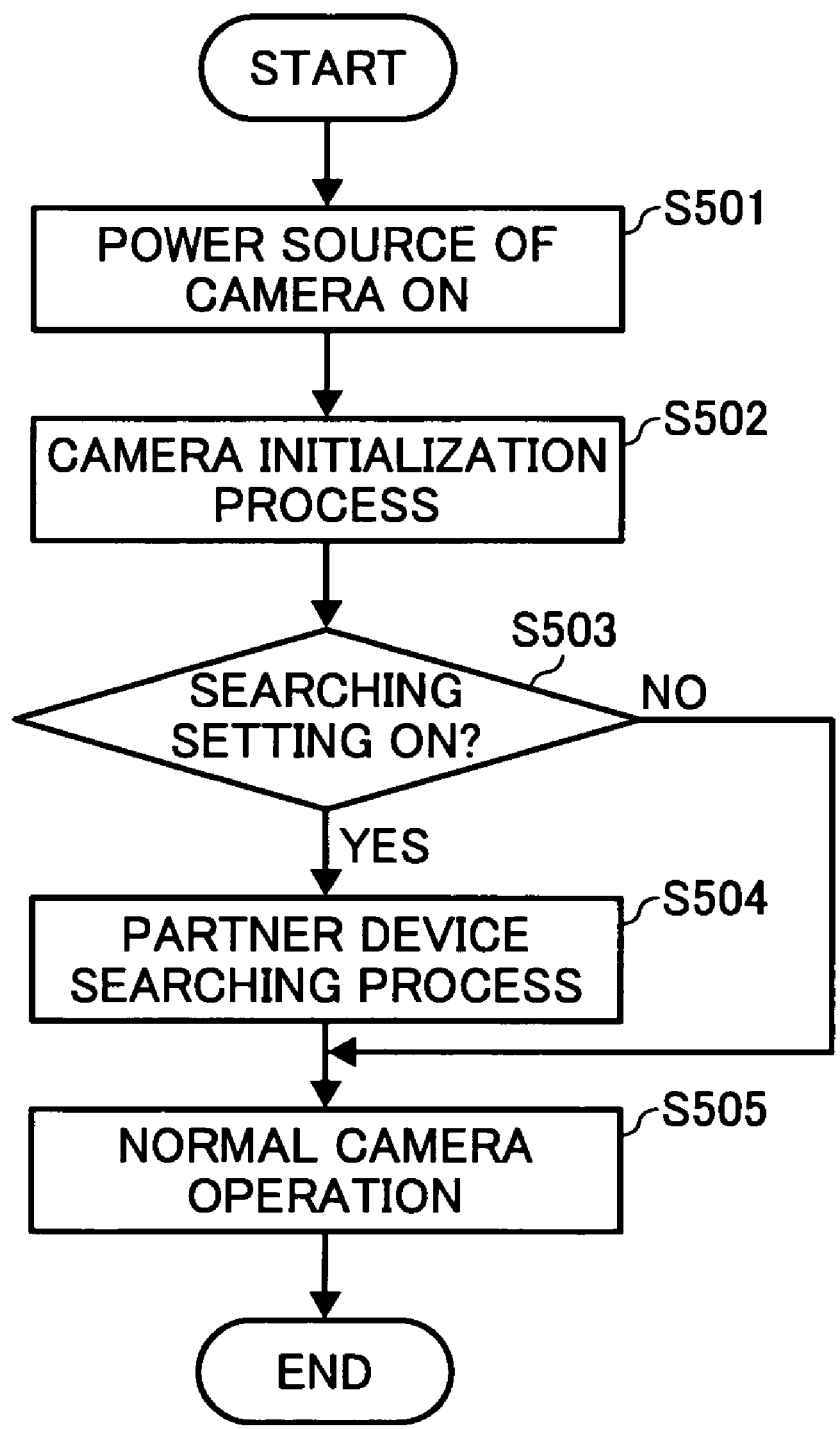
FIG. 5 is a flow chart illustrating operation after turning on the power source of the digital camera 100.

In this case, if ON is selected to determine the wireless partner searching setting, the wireless partner searching setting becomes activated. After turning on the power source of the camera, the camera is initialized as illustrated in FIG. 5.

The initialization of the digital camera 100 will be described with reference to FIG. 5.

At first, if the power source of the digital camera 100 is powered on, the power source becomes in the ON state (step S501). The power source of the digital camera 100 may be powered on by the operation of the power source switch 110 by an operator of the digital camera 100, or by a timer previously set in the ROM 137.

Next, the initialization process of the digital camera 100 is conducted (step S502). If the initialization process is completed, the control section 141 reads out the searching setting stored in the internal memory 145, so as to determine whether the searching setting is ON (search) or OFF (no search).

If the searching setting is ON: (Yes at S503), the control section 141 performs a partner device searching process (step S504) by using the Bluetooth circuit 157. The details of this process will be described later.

If the searching setting is OFF (No at S503), the process of step S504 is not conducted.

After that, a normal camera function is operated (step S505) for either case.

In addition, the partner device searching process and the process for operating the normal camera function can be conducted at the same time. In this case, the searching process is conducted in the background of the normal camera process.

Figure 6:
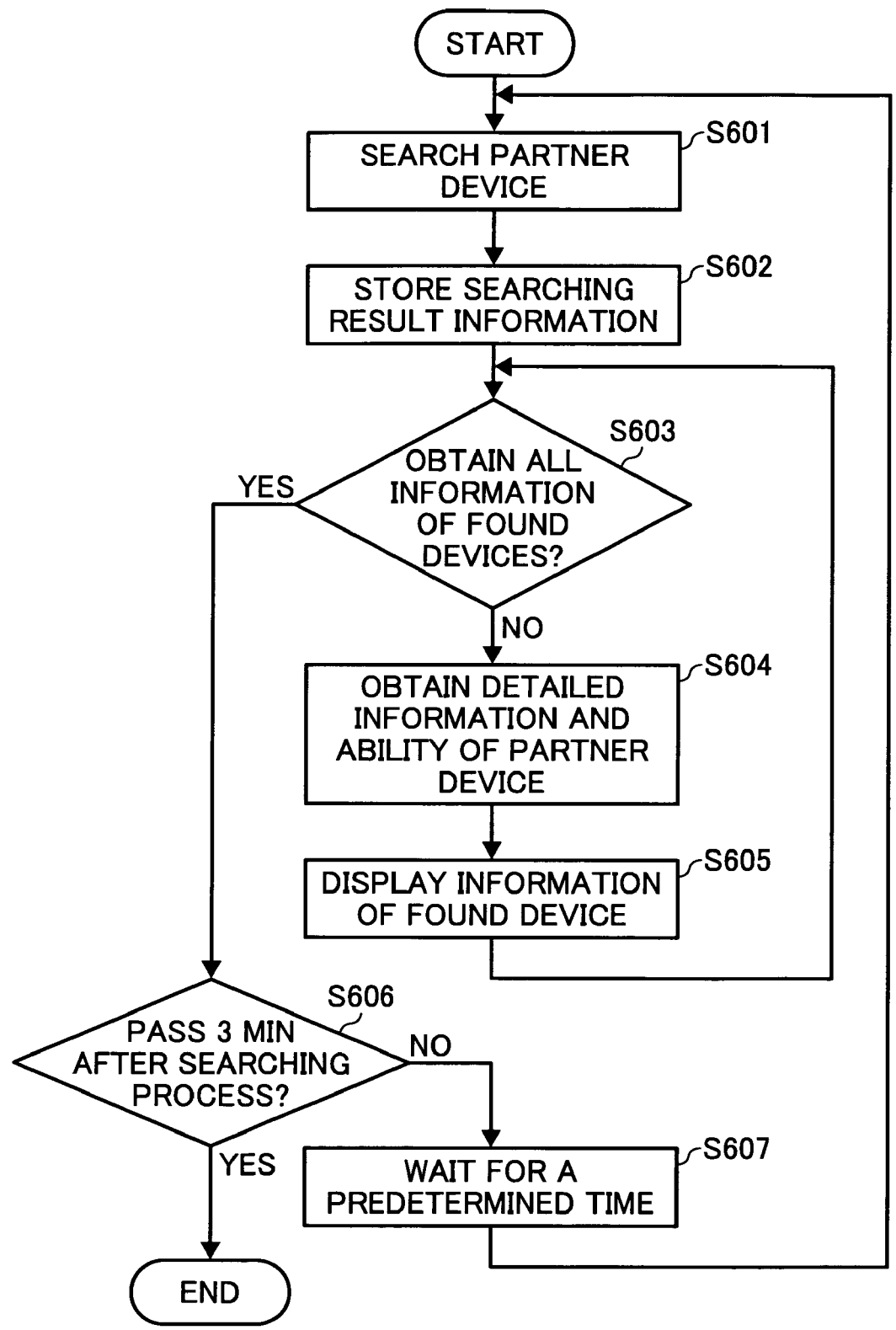
FIG. 6 is a flow chart illustrating one example of a wireless partner searching process.

Next, the partner device searching process of the digital camera 100 will be described with reference to FIG. 6.

At first, if the searching process is started, a peripheral Bluetooth device, which can become a communication partner, is searched for (step S601).

The information of the searching result is stored (step S602). At this step S602, it is not necessary to obtain the detailed information of the partner device. All of the communicatable partner devices are searched for (at step S601), and the information such as the number of the partner devices found at step S601 is stored (step S602).

Here, "communicatable" means a state that the partner device physically has the same interface and the partner device has the same protocol for exchanging information with each other.

Until all of the information of the found devices is obtained (step S603), the detailed information of the found devices is sequentially obtained (step S604). The information of the found devices is displayed on the LCD monitor 111 (step S605).

The detailed information includes a type, a correspondence function of the partner device and capability information (capability information including a correspondence paper type and a correspondence paper size) for each device such as a printer.

In addition, at this point, it is not always necessary to obtain the capability of each Bluetooth function loading device including a printer. It can be obtained when actually performing the communication.

If all of the detailed information of the found devices is obtained (Yes at step S603), it is confirmed whether or not a predetermined time (3 minutes in FIG. 6) has passed after the activation (step S606).

If the predetermined time has passed (Yes at step S606), the searching process is completed.

If the predetermined time has, not passed (No at step S606), a partner device is re-searched for (return to step S601) after waiting for a predetermined time (step S607). Here, "a predetermined time" is, for example, 30 seconds; thus, the researching for the partner device is conducted after waiting for 30 seconds.

By performing the above described searching method, the peripheral devices can be always searched for, and an effect, which does not use unnecessary power, can be obtained.

The details of the searching process may be changed according to the operation mode of the digital camera 100. Next, an embodiment whereby the details of the searching process change according to the operation mode set to the digital camera 100 will be explained with reference to FIG. 7.

In the digital camera 100, an operator can select any one of the operation mode from a plurality of choices such as still image photographing, movie photographing, voice recording, reproducing, setting up, and communication by means of the mode dial 102 illustrated in FIG. 1.

Figure 7:
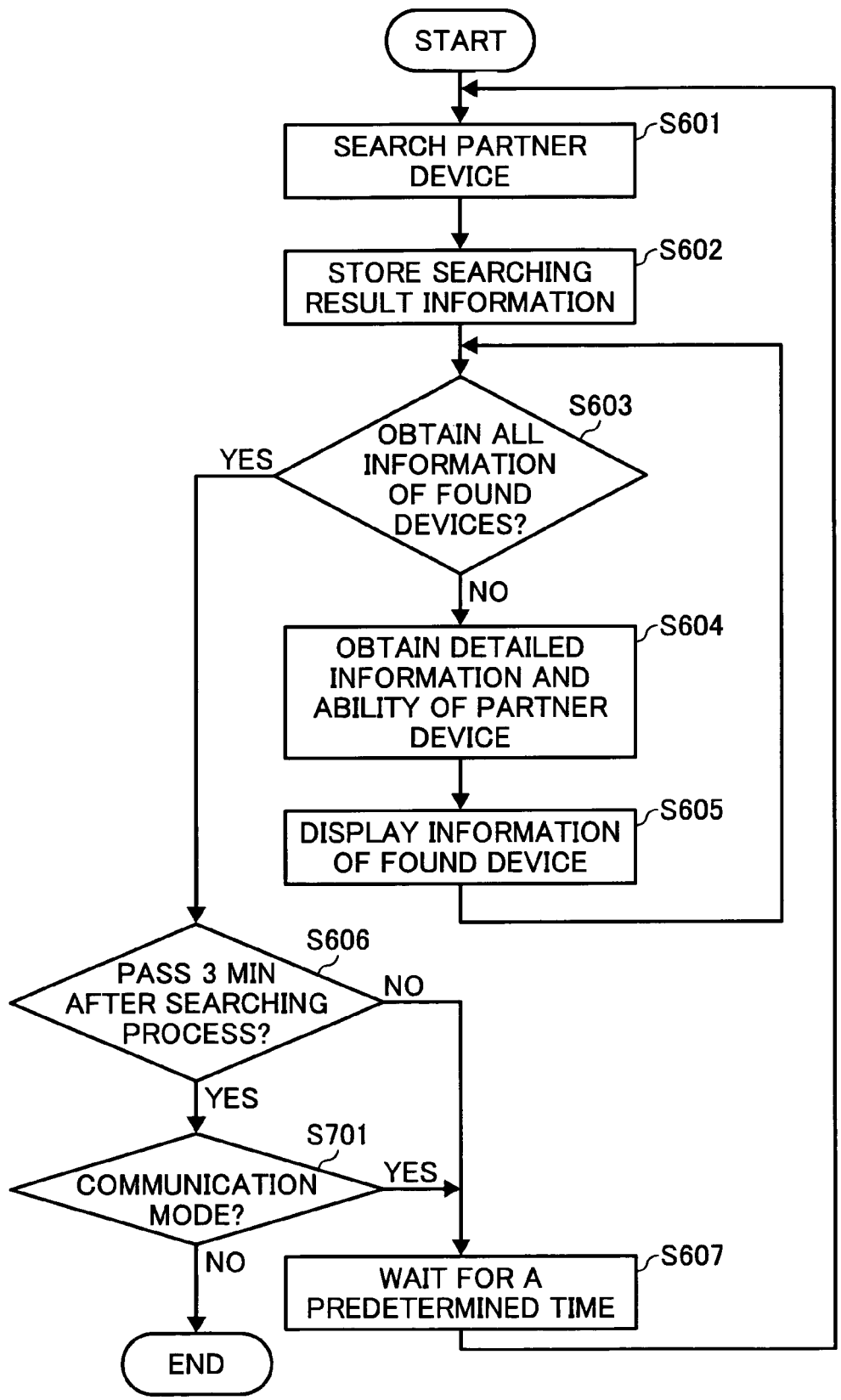
FIG. 7 is a flow chart illustrating one example of a wireless partner searching process.

FIG. 7 is a flow chart of a wireless partner searching process illustrating the embodiment whereby the searching process changes if an operation mode is previously selected by the mode dial 102. In this embodiment, the reference numbers used in FIG. 6 are used for the processes which overlap with the processes in FIG. 6; thus, the detailed explanation of the processes will be omitted.

In this embodiment, a communication partner device is searched for, the information of all of the found out communication partner devices is stored, and then it is confirmed whether or not the predetermined time (for example, 3 minutes) has passed since the start of the searching process. After that, it is examined whether or not the operation mode of the digital camera 100 is "communication" (hereinafter, referred to as a communication mode) (step S701).

If the operation mode of the digital camera 100 is the communication mode (Yes at S701), a process for waiting for a predetermined time is conducted (at step S607), and a partner device is re-searched for after waiting for a predetermined time. If the operation mode of the digital camera 100 is not the communication mode (No at step S701), the searching process is completed.

By conducting the above-described searching method, a peripheral device can be always searched for, and the effect, which does not use ineffectual power, can be obtained.

Next, a specific embodiment when capability of a printer is not obtained in searching will be described with reference to FIG. 8.

Figure 8:
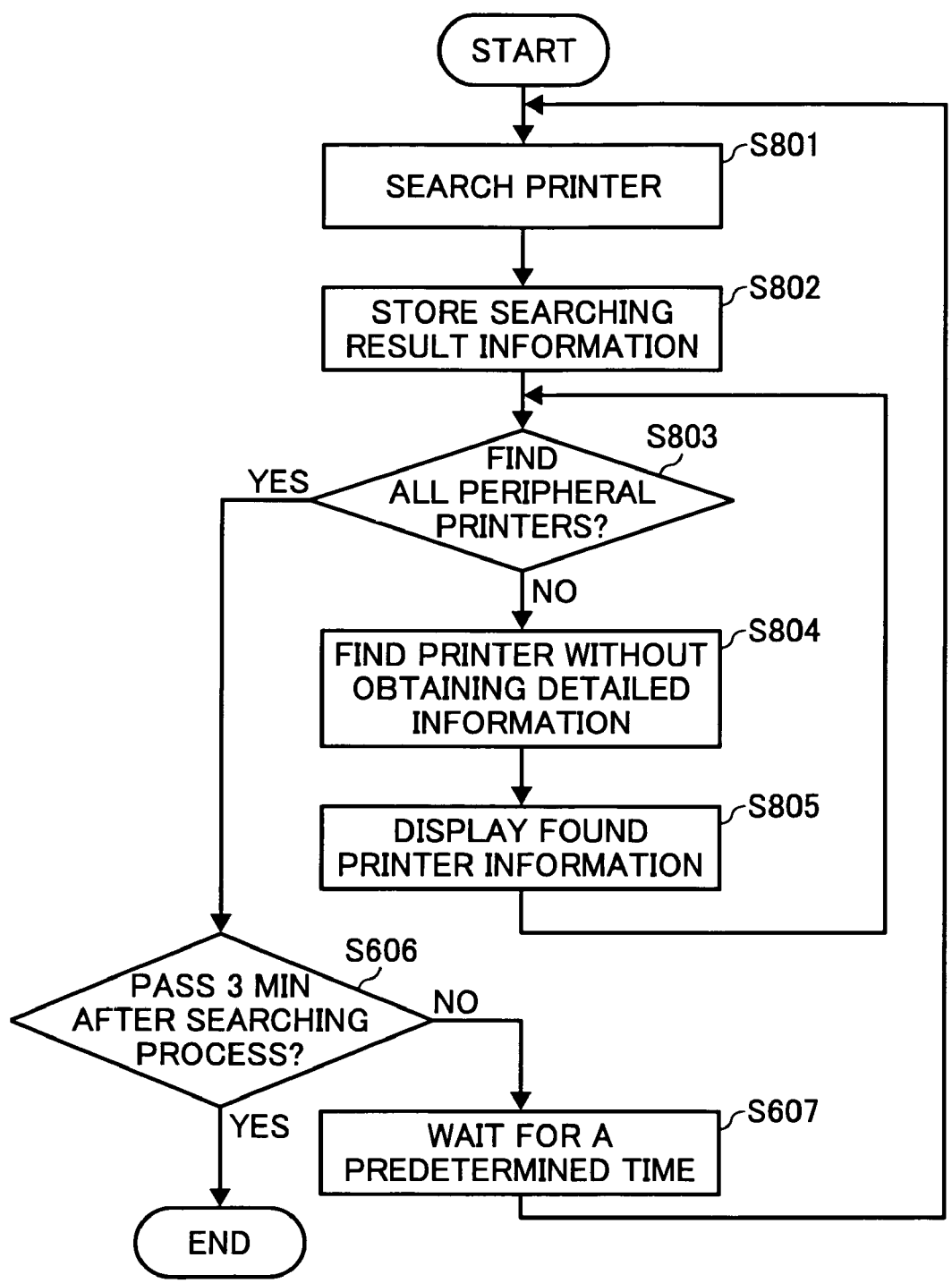
FIG. 8 is a flow chart illustrating one example of a wireless partner searching process when the wireless partner is only a printer.

FIG. 8 is a flow chart illustrating a searching process when a partner device is only a printer. In this embodiment, the reference numbers used in FIG. 6 are used for the processes which overlap with the processes illustrated in FIG. 6; thus, the detailed explanation will be omitted.

At first, if the searching process is started, a printer is searched for (step S801). In this case, the number of the found printers is stored (step S802).

Next, until all of the peripheral printers are found, the process for finding a printer is conducted (step S804) without obtaining detailed capability information, and then the information of the found printer is displayed on the LCD monitor 111 (step S805).

If all of the peripheral printers are found (Yes at step S803), the repeated processes from step S803 to S805 are completed, and it is examined whether or not a predetermined time (3 minutes in the example of FIG. 8) has passed since the start of the searching process (step S606). The subsequent processes are the same as the processes illustrated in FIG. 6; thus, the explanation will be omitted.

The feature of the present embodiment is to search for all of the communicatable printers without obtaining the detailed information of the partner printer when the searching process is started. In this case, the detailed information including the capability information of the partner printer is obtained when the printer process is actually started.

Moreover, the re-searching process is not always necessary. In this case, the structure, which determines whether or not the re-searching is conducted according to the operation mode of the digital camera 100, is used as the embodiment described by FIG. 7.

As described above, by performing the above-described searching method, the peripheral device (especially, a printer) can be always searched for, and the effect which does not use unnecessary power can be obtained.

(Detailed Procedure of Searching Process)

Next, the detailed procedure of the searching process of the digital camera 100 when conducting the Bluetooth communication will be described. In this case, the digital camera 100 corresponds to BIP (Basic Imaging Profile) and DUN (Dial Up Network) profile of the Bluetooth.

Figure 9:
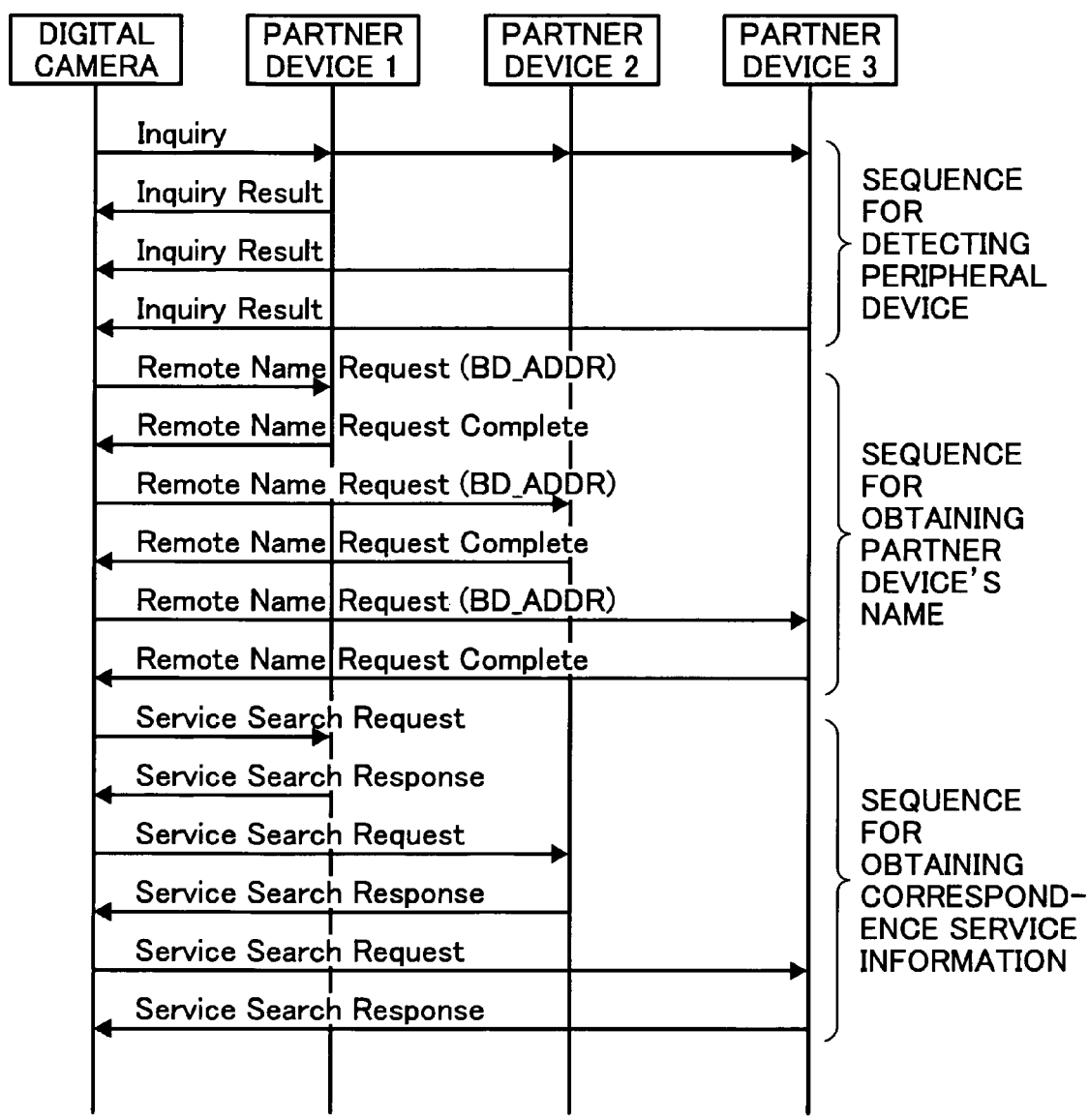
FIG. 9 is a view illustrating a searching process communication sequence using Bluetooth as an example.

At first, the details of the searching process having an example of Bluetooth will be described in accordance with FIG. 9 illustrating the communication sequence of the searching process. In addition, the example using three peripheral devices will be described.

If the searching process is started, the peripheral device is detected. In the detection of the peripheral device, an Inquiry request is conducted from the digital camera to each of the peripheral devices. With respect to the Inquiry, an Inquiry Result is sent from each of the peripheral devices to the digital camera. The peripheral Bluetooth devices are searched with these contents, and BC_ADDR (specific address of Bluetooth device) and a device class (such as PC, PDA, cell-phone, and printer) are obtained as illustrated in FIG. 10. Next, with respect to the BD_ADDR obtained by the Inquiry, a device's name request (Remote Name Request) is conducted from the digital camera to each of the peripheral devices 1-3, and a partner device's name is obtained from the contents of the Remote Name Request from each of the peripheral devices 1-3 as illustrated in FIG. 11. Next, a Service Search Request is conducted to each of the peripheral devices 1-3 from the digital camera, and correspondence service information of the peripheral Bluetooth device is obtained from the contents of the Service Search Response from each of the peripheral devices 1-3 as illustrated in FIG. 12. In this case, the correspondence service is dial-up connecting profile (Dial-UP Networking Profile), BIP (Basic Imaging Profile) or the like prescribed by Bluetooth.

Figures 13, 14:
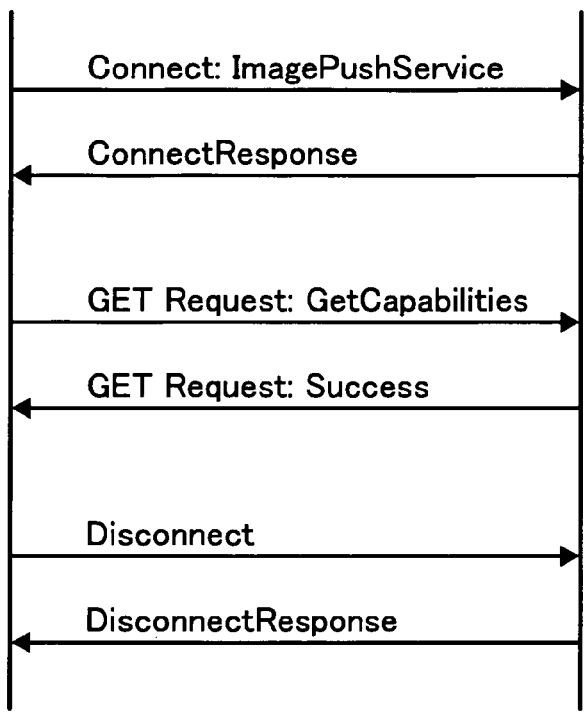
FIG. 13 is a view illustrating a procedure sequence for obtaining detailed information of the found Bluetooth device.
FIG. 14 is a view describing detailed information of a partner's device.

Hereinbelow, the procedure for obtaining the detailed information of the found device will be described with reference to FIG. 13 illustrating the procedure sequence for obtaining. The sequence illustrated in FIG. 13 is the procedure of Get Capability of BIP.

At first, the digital camera is connected with the partner device (Connect: Image Push Service). A partner device information obtaining command (GET Request. Get Capabilities) is sent, and the detailed information of the partner device is obtained. The detailed information of the partner device is information including the DOF correspondence, the correspondence encode method (JPEG, GIF or the like), the correspondence maximum file size, the multi-printing correspondence, and the index printing correspondence.

According to the above-described embodiment, the imaging apparatus includes a photographing device for photographing a subject image to output as image data, a recording device for recording the image data as an image file, a wireless communication device, a partner device searching device for searching for a communicatable partner device, and a wireless communication setting device for setting the wireless communication device to be effective or to be invalid. If the wireless communication device is effectively set by the wireless communication setting device, the partner device searching device automatically starts the searching after the activation of the imaging device. Accordingly, only when the wireless communication device is effectively set, the wireless searching operation is conducted. Therefore, the power consumption for searching for a partner device can be reduced, and also unnecessary power can be prevented. Also, the imaging apparatus which does not disturb a high-speed photographing process is provided.

According to the present embodiment, the searching by the partner device searching device is automatically started after the activation of the imaging device, and is regularly conducted. If a predetermined time has passed after the activation of the imaging device, the searching process is stopped. Accordingly, the power consumption for searching a partner device can be reduced, and unnecessary power use can be prevented. Also the imaging apparatus which does not disturb a high-speed photographing process is provided.

According to the present embodiment, if a certain mode (for example, a communication mode) is selected, the regular searching is continued. Therefore, the power consumption for searching for a partner device can be reduced, and unnecessary power use can be prevented. Also, the imaging apparatus which does not disturb a high-speed photographing process is provided.

According to the embodiment of the present invention, the imaging apparatus is provided, which can immediately conduct the communication if an operator wishes, does not consume unnecessary power by a partner searching process, and also does not disturb a high-speed photographing process.

Although the present invention has been described in terms of exemplary embodiments, it is not limited thereto. It should be appreciated that variations may be made in the embodiments described by persons skilled in the art without departing from the scope of the present invention as defined by the following claims. In addition, the number, position, shape, or the like of the components are not limited to the above embodiments, and can be changed to a number, position, shape or the like of components preferable for conducting the present invention. Moreover, no element or component in the present disclosure is intended to be dedicated to the public regardless of whether the element or component is explicitly recited in the following claims.

What is claimed is:

1. An imaging apparatus, comprising:
    an imaging device for photographing a subject image to output as image data;
    a recording device for recording the image data as an image file;
    a wireless communication device;
    a partner device searching device for searching for a partner device of a wireless communication; and
    a wireless communication setting device for setting the wireless communication device to be effective or to be invalid, and
    wherein when the wireless communication device is effectively set by the wireless communication setting device, the partner device searching device automatically starts the searching for the partner device with activation of the imaging device; and
    wherein after the partner device searching device automatically starts the searching for the partner device with the activation of the imaging device, the partner device searching device regularly repeats the searching, and the apparatus is configured to stop an operation for regularly repeating the searching if a predetermined time has passed; and
    wherein said imaging apparatus further comprises: an operation mode setting device for setting an operation mode of the imaging apparatus; and an operation mode setting handling device for handling the operation mode setting device, wherein the operation mode includes a communication mode for conducting the wireless communication by using the wireless communication device, and when the operation mode is set to the communication mode by the operation mode setting device, after the partner device searching device automatically starts the searching for the partner device with the activation of the imaging device, the partner device searching device regularly repeats the searching for the partner device, and does not stop the operation for regularly repeating the searching if the predetermined time has passed.

2. A wireless communication partner searching method of an imaging apparatus comprising an imaging device for photographing a subject image to output as image data, a recording device for recording the image data as an image file, a wireless communication device, a partner device searching device for searching for a partner device of a wireless communication, and a wireless communication setting device for setting the wireless communication device to be effective or to be invalid, comprising:
 a wireless communication setting step of setting the wireless communication device to be effective or to be invalid; and
 a searching start step of automatically starting the searching for the partner device of the wireless communication with an activation step of activating the imaging device when the wireless communication device is effectively set by the wireless communication setting step; and
 wherein after the searching start step is conducted with the activation step, a regular searching step of regularly repeating the searching for the partner device of the wireless communication is conducted until a predetermined time has passed, and wherein the imaging apparatus is arranged to perform a searching stop step of stopping the searching if the predetermined time has passed; and
 wherein the imaging apparatus further comprises an operation mode setting device for setting an operation mode of the imaging apparatus, and an operation mode setting handling device for handing the operation mode setting device, and the operation mode including a communication mode for conducting the wireless communication by using the wireless communication device, and wherein the wireless communication partner searching method further comprises: an operation mode setting handling step of handling the operation mode setting device by using the operation mode setting handling device; and an operation mode setting step of setting the operation mode of the imaging apparatus by using results of the operation mode setting handling step, wherein the regular searching step is conducted after the searching start step is conducted with the activation step, and when the results of the operation mode setting step are set to the communication mode, the searching stop step is not conducted if the predetermined time has passed.

3. The imaging apparatus of claim 1, wherein said operation mode setting device is arranged to switch from said communication mode to a photographing mode.

4. The imaging apparatus of claim 3, wherein said operation mode setting handling device includes a dial located on said imaging device.

* * * * *